UNITED STATES PATENT OFFICE.

CLINTON FURBISH, OF BROOKLYN, NEW YORK.

PROCESS OF MANUFACTURING GLUCOSE.

SPECIFICATION forming part of Letters Patent No. 226,398, dated April 13, 1880.

Application filed January 7, 1880.

*To all whom it may concern:*

Be it known that I, CLINTON FURBISH, of Brooklyn, in the county of Kings and State of New York, have made an invention of certain new and useful Improvements in the Art of Manufacturing Glucose and Sweet-Liquor from Corn; and I do hereby declare that the following is a full, clear, and exact description and specification of the same.
Previous to my present invention glucose or sweet-liquor has been manufactured from the material known by the several names of "Indian corn," "corn," and "maize" by various systems.
According to one system the grain-corn is soaked in water, or in water acidulated with a suitable acid, and is ground while in a wet state, and the starch is separated from the wet product by washing with water, and is then transformed into glucose either by the use of diastase or a suitable acid. This system is objectionable, because of the loss of the free sugar of the corn by the soaking and washing processes, and also because of the expense of time and labor attending the various operations.

According to another system the corn is ground into meal, or otherwise comminuted, and the corn-meal is directly treated, either by the acid process or by the diastase process, to transform the starchy matter of the corn into glucose. This system is objectionable, because the presence of the woody fiber and oily matters of the corn during the process of conversion prevents the proper action of the acid or diastase; and, further, because the product of the acid or diastase upon these substances is injurious in its effect upon the glucose so produced.
According to another system the grain-corn is treated by what is commonly known as the "hominy process," by which the oily matters and woody fiber are removed, and the product is then ground to flour and transformed into glucose or sweet-liquor either by the acid process or by the diastase process. This system is objectionable, because of the great expense of time, labor, and power required by the grinding operations; and, further, because when the diastase process is used it is not possible, by the means in use and described, to so thoroughly exfoliate the starchy matters of the corn as to allow a proper action of the diastase, and as a consequence the glucose or sweet-liquor so produced not only contains elements of unconverted starchy matters injurious to its value for all uses, but there is also occasioned a serious loss from the fact that there still remains in the residuum after the liquor has been drawn off an amount of valuable starchy matter unconverted, which loss seriously increases the cost of the product obtained.

According to another system the grain-corn (either whole or ground to meal or flour) is placed in a suitable tank with a quantity of water and reduced to a pulpy mass by means of heat and pressure, after which the mass so produced is transformed into glucose or sweet-liquor either by the use of acid or diastase. This system is objectionable, because the corn so treated contains all of its original oily matters and woody fibers, and the effect of the heat and pressure upon them is to produce in the resultant liquor both a taste and color very difficult, if not impossible, to remove. This system is further objectionable, because the glucose or sweet-liquor so produced contains either the oily matters of the corn or the product of acid or diastase upon them.

The object of the present invention is to reduce the cost of manufacturing glucose or sweet-liquor from corn, and to produce an article of superior quality, which, when made by the use of diastase, may be practically free from oily matters and from unconverted starchy matters; and it consists of a compound process, the first step of which consists of pearling the grain, or the reduction of the kernels by a dry clipping and cracking treatment, by which the hulls and heart of the kernels are separated from the hard starchy portions; and, second, the reduction of these starchy portions to a soft pulpy mass; and, third, the conversion of the starchy matters of this mass into glucose or sweet-liquor; and in order that my invention may be fully understood I will proceed to describe the manner in which I have practiced it with success.

The Indian corn (shelled from the ear and winnowed) is subjected to the action of a cracking and hulling machine, such, for example, as is used in the manufacture of hominy. By the action of this machine the kernels of corn are hulled, clipped, and cracked, and the hulls and fine-clipped portions are separated from the harder portions of the grain. The hulls and fine-clipped portions contain the bulk of the woody fiber and oily and albuminous matters of the corn, each of which may be separated, if desired, by a proper arrangement of bolts. The harder portions of the grain so obtained, containing the bulk of the starchy matters of the corn, are then placed in a close vessel or tank with water and subjected to the effect of heat and pressure, by which means the mass is reduced to a pulpy state and the starchy matters of the purified granular portions of the corn rendered peculiarly susceptible to the action of either diastase or acid for conversion into sweet liquor.

If acid is to be used, I prepare a suitable vessel or tank capable of holding the required pressure and provided with steam-heating pipes. In this tank or vessel I place the diluted acid, and by connecting it with the first-described tank am enabled by pressure to transfer the contents of the first to the second, and then by closing the second tank to proceed with the conversion by heat and pressure by the well-known and often-described process.

If diastase is to be used, I discharge the pulpy mass from the vessel or tank into an open tank or vessel provided with a coil for heating and cooling and with a suitable stirrer or stirrers. By means of water running through the coil while stirring is continued I reduce the mass to a temperature of about 120° Fahrenheit, when I add a solution of barley-malt at a temperature of about 100° Fahrenheit, in the proportion of eight pounds of dry malt for every hundred pounds of dry corn treated as above described in the first step of my compound process; and I have found it best in practice to use in the vessel or tank in which the purified starchy portions of the corn are subjected to pressure about fifty gallons of soft water for every one hundred pounds of such dry starchy portions of the corn. After adding the solution of malt above described I gradually raise the temperature of the mass by passing steam through the coils, while stirring is continued until the mass attains a temperature of about 165° Fahrenheit, and I have obtained the best results by raising the temperature at the rate of 1° Fahrenheit per minute. When, by testing, either by iodine, alcohol, or by a saccharometer, I find the starchy matters of the corn thoroughly converted, I draw off the liquor, separating it from the solid residuum either by means of a filter-press, such as described in the patent issued to me January 6, 1880, or by means of the action of a properly-arranged centrifugal machine, or by any other suitable device. The liquor may then be filtered through bone-filters and concentrated to the proper gravity required for sale, or it may be used unfiltered in the manufacture of malt liquors, alcohol, or vinegar, as may be desired. The sweet liquor so produced will be found practically free from starchy matters, and on this account peculiarly adapted for the manufacture of malt liquors.

The process as above described is not restricted to the use of a particular kind or exact quantity of malt, as rye-malt may be used for the purpose, and the quantity of malt may be varied as circumstances render expedient. Nor is the process restricted to the maintenance of the heat at the exact temperatures named, as these may be varied without materially changing the result.

From the foregoing description it appears that my new process differs substantially from preceding processes for the production of glucose or sweet-liquor from corn in the respect that according to them the corn is either treated in its natural state, containing the oily matters and woody fiber, or, if such oily matters and woody fiber are separated by a dry treatment prior to conversion such conversion must be preceded by the fine grinding of the separated starchy matters of the corn.

I claim as my invention—

The process, substantially as described, of producing glucose or a saccharine solution from corn practically free from oily and unconverted starchy matters, consisting of the following operations, viz: first, separating the hulls and heart from the harder and starchy matters of the corn; second, subjecting the starchy matters so separated, with water, to the effect of steam under pressure; third, transforming the mass so produced into glucose or a saccharine solution, substantially as above described.

CLINTON FURBISH.

Witnesses:
B. E. J. EILS,
E. O. BALL.